United States Patent
Ernström (10) Patent No.: US 8,750,309 B2
(45) Date of Patent: Jun. 10, 2014

(54) COMPOUND MASKING AND ENTROPY FOR DATA PACKET CLASSIFICATION USING TREE-BASED BINARY PATTERN MATCHING

(75) Inventor: Lars Ernström, Palo Alto, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 148 days.

(21) Appl. No.: 13/408,771

(22) Filed: Feb. 29, 2012

(65) Prior Publication Data

US 2013/0223446 A1  Aug. 29, 2013

(51) Int. Cl.
*H04L 12/56* (2011.01)

(52) U.S. Cl.
USPC ........... 370/392; 370/389; 370/391; 340/10.3

(58) Field of Classification Search
USPC ........................... 370/389, 391, 392; 340/10.3
See application file for complete search history.

(56) References Cited

U.S. PATENT DOCUMENTS

2007/0112794 A1* 5/2007 McRae ......................... 707/100
2010/0156604 A1* 6/2010 Dong ............................ 340/10.3

OTHER PUBLICATIONS

Gupta et al., "Packet classification using hierarchical intelligent cuttings," in Proc. Hot Interconnects, 1999.
Gupta et al., "Packet classification on multiple fields," in SIGCOMM 99, 1999.
Lakshman et al., "High speed policy-based packet forwarding using eficient multi-dimensional range matching," in SIGCOMM, 1998.
Baboescu et al., "Scalable packet classification," in SIGCOMM, 2001.
Baboescu et al., "Packet classification for core routers: Is there an alternative to CAMs?" in INFOCOM, 2003.
Feldman et al., "Tradeoffs for packet classification," in INFOCOM, 2000.
Woo, "A modular approach to packet classification: Algorithms and results," in INFOCOM, 2000.
Srinivasan et al., "Fast and scalable layer 4 switching," in SIGCOMM, 1998.
Matsumoto, "CAM vendors consider algorithmic alternatives," May 2002, EETimes.
Degermark et al., "Small forwarding tables for fast routing lookups," in SIGCOMM, 1997.
Buddhikot et al., "Space decomposition techniques for fast layer-4 switching," in Proc. PHSN, 1999.
Srinivasan et al., "Packet classification using tuple space search," in SIGCOMM, 1999.
Qiu et al., "Fast firewall implementation for software and hardware based routers," in Proc. ICNP, 2001.
Singh et al., "Packet Classification Using Multidimensional Cutting," Aug. 25-29, 2003, 12 pages, SIGCOMM'03, Karlsruhe, Germany.
Gupta et al., "Packet Classification on Multiple Fields," 1999, 14 pages, ACM Sigcomm.

* cited by examiner

*Primary Examiner* — Dang Ton
*Assistant Examiner* — Mewale Ambaye
(74) *Attorney, Agent, or Firm* — Blakely Sokoloff Taylor & Zafman, LLP (57) ABSTRACT

A method in a network element of a packet data network classifies a data packet for application of a packet data network policy. A root node compound bit mask is applied to bits of a received data packet. The data packet has data in a plurality of fields. The compound bit mask has a plurality of bit masks each having bits in a different data packet field. The masked bits of the compound bit mask are applied to root node bit tables, one for each bit mask of the compound bit mask. A branch node from the root node is selected based on a bit table look up.

22 Claims, 6 Drawing Sheets

COMPOUND MASKING AND ENTROPY FOR DATA PACKET CLASSIFICATION USING TREE-BASED BINARY PATTERN MATCHING

FIELD

Embodiments of the invention relate to the field of data packet classification in packet data communications; and more specifically, to the compound masks in a pattern matching tree.

BACKGROUND

Many network services use packet classification, such as routing, access control, policy-based routing, quality-of-service differentiation, billing, etc. In one application a packet classifier examines packets to determine whether to forward or filter a packet and to apply an appropriate class of service to the packet. Classification is typically based on reading the data in headers of the packet, such as addresses, port numbers, or other fields in headers and tail bits of a data packet. In the simplest implementations, the values in the appropriate fields are applied to lookup tables and when there is a match, a corresponding rule or a policy is applied to the packet.

Some packet classification systems perform binary pattern matching using Access Control Lists (ACLs). ACLs consist of bit patterns or rules that are used to classify bits. Filter ACL are used to determine whether a given bit field is admitted or not. ACLs are used in packet based communication networks where ACL rules may be based on address and port information in the packet header. ACLs may also be based on fields deeper into the packet for Deep Packet Inspection. Policy ACLs are used in packet based networks to classify traffic into classes which each receive separate treatment, for example in terms of forwarding, queuing, rate limitation, and marking. For complete packet routing all of these lists must be examined and matched to incoming packets. In some applications, matching may be done by different routers and some ACLs may be ignored in order to save time.

To allow for many different types of packets to be routed at high speed, packet classification has been advanced beyond simple lookup tables. Some systems use a staged lookup process in which a first part of the package is examined. The result of that examination is used to select the second part to be examined in a branched decision process. This classification continues with different branches being taken until the final classification is reached. While more steps are used, each step in the process is simplified and if the system is well-designed, then classification is faster. This can be referred to as tree-based classification in which the first decision is a root node and each resulting decision is a branch node. The last branch node is referred to as a leaf node. After the leaf node process, the packet is classified.

In order to route a larger variety of different packets more quickly, pattern matching algorithms must be improved in terms of lookup time, processing and memory usage. This is made more difficult by the cost associated with implementing algorithms for different types of ACLs such as IPv4 (Internet Protocol version 4), IPv6 (IP version 6), Ethernet, ATM (Asynchronous Transfer Mode), etc. TCAM (Ternary Content Associated Memory) hardware accelerated algorithms have been developed to address these problems. TCAM uses parallel hardware to check for all rules in parallel. While the hardware is fast it is expensive and requires large memory resources and high power consumption. In applications with thousands of sessions where individual ACLs are required, the resources of a TCAM system may run out.

SUMMARY

Embodiments of the present invention allow a packet classification tree to use compound masks for packet classification so that the tree is traversed in fewer steps and using fewer resources. The packet classification tree may be defined more efficiently and more directly using entropy on candidate bit masks. The resulting tree is more effective at classifying packets using fewer processing resources.

In one embodiment, the invention includes a method in a network element of a packet data network to classify a data packet for application of a packet data network policy. A root node compound bit mask is applied to bits of a received data packet. The data packet has data in a plurality of fields. The compound bit mask has a plurality of bit masks each having bits in a different data packet field. The masked bits of the compound bit mask are applied to root node bit tables, one for each bit mask of the compound bit mask. A branch node from the root node is selected based on a bit table lookup of the masked bits match.

At the branch node, a branch node bit mask associated with the selected branch node is applied to bits of the received data packet. The masked bits of the selected branch node bit mask are applied to at least one branch node bit table, and the received data packet is classified based on a branch node bit table lookup of the selected branch node bit mask.

In another embodiment a network element is used in a packet data network to classify a data packet for application of a packet data network policy. The network element comprises an ingress module to receive a data packet, from the packet data network, an egress module to forward the data packet to another network element based on a policy, a network processor. The network processor has a classification tree with a plurality of bit tables. The network processor applies a root node compound bit mask to bits of a received data packet. The compound bit mask has a plurality of bit masks each having bits in a different data packet field. The network processor applies the masked bits of the compound bit mask to root node bit tables, one for each bit mask of the compound bit mask. It selects a branch node from the root node based on a bit table lookup of the masked bits match the bit tables. It applies a branch node bit mask associated with the selected branch node to bits of the received data packet. It applies the masked bits of the selected branch node bit mask to at least one branch node bit table, and it classifies the received data packet based on a branch node bit table lookup of the branch node bit mask.

In another embodiment, the invention includes a method for generating a sequence of bit masks for a packet classification tree for use by a network element of a packet data network to classify data packets for application of a packet data network policy. The method includes selecting a plurality of bit masks as candidate root node bit masks, calculating an entropy for each of the bit masks based on a probability of different values of the masked bits, selecting a bit mask from the candidate root node bit masks as a root node bit mask of the packet classification tree, and defining a root node bit table for the selected bit mask to point to branches of the packet classification tree. The method further includes selecting branch node bit masks and defining branch node bit tables to point to policies to classify a data packet.

In another embodiment, a non-transitory computer-readable medium has instructions stored thereon that, when executed by the machine, cause the machine to perform operations for generating a sequence of bit masks for a packet classification tree for use by a network element of a packet data network to classify data packets for application of a packet data network policy. The operations include selecting a plurality of bit masks as candidate root node bit masks, calculating an entropy for each of the bit masks based on a probability of different values of the masked bits, selecting a bit mask from the candidate root node bit masks as a root node bit mask of the packet classification tree, and defining a root node bit table for the selected bit mask to point to branches of the packet classification tree. The operations further include selecting branch node bit masks and defining branch node bit tables to point to policies to classify a data packet.

BRIEF DESCRIPTION OF THE DRAWINGS

The invention may best be understood by referring to the following description and accompanying drawings that are used to illustrate embodiments of the invention. In the drawings.

2A is a block diagram illustrating the network element of FIG. 1 as a group of line and data processing cards according to one embodiment of the invention.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. In other instances, control structures, gate level circuits and full software instruction sequences have not been shown in detail in order not to obscure the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

As used herein, a network element (e.g., a router, switch, bridge) is a piece of networking equipment, including hardware and software, that communicatively interconnects with other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOW) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Figure 1:
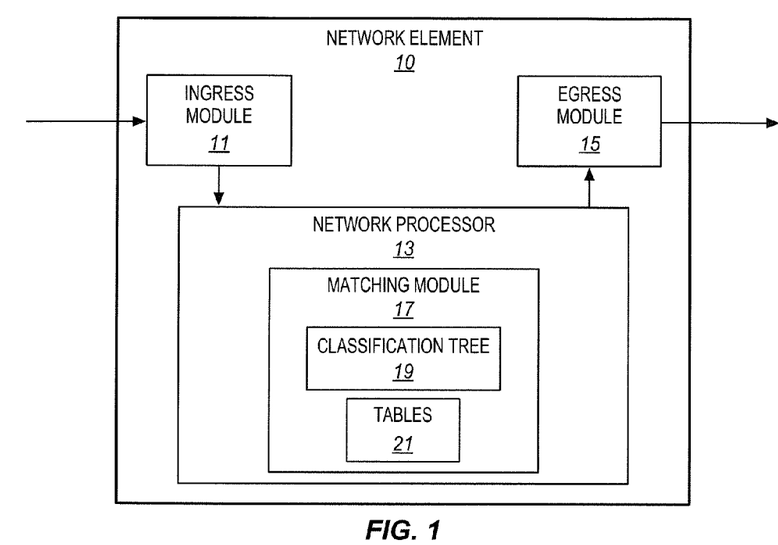
FIG. 1 is a diagram of one embodiment of a network element functioning as an access node according to one embodiment of the invention.

FIG. 1 is a diagram of one embodiment of a network element functioning as an access node, however other network elements may have a similar configuration. The network element 10 includes an ingress module 11, an egress module 15 and a network processor 13. The ingress module 11 handles the processing of data packets being received by the network element at the physical link and data link level. The egress module 15 handles the processing and data packets being transmitted by the network element at the physical link and data link level. The ingress and egress modules communicate with subscribers, edge routers, and other network elements through IPv4, IPv6, ATM or any of a variety of other formats and protocols.

The network processor 13 handles the routing, forwarding and higher level processing of the data traffic. It includes a matching module 17 with a classification tree 19 and look up tables 21 to apply when a match is found. The tables relate matched bit patterns found by the classification tree to rules or policies that allow packets to be classified. The classified packets may be forwarded to another network element with or without additional classification information, discarded, or returned.

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

For layer 2 forwarding, the network element can store one or more bridging tables that are used to forward data based on the layer 2 information in this data.

Figure 2A:
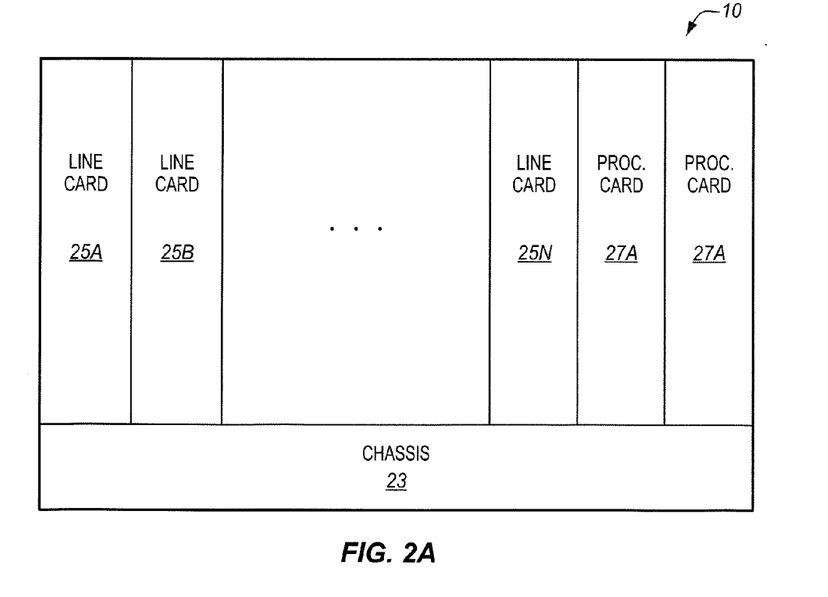

FIG. 2A is a block diagram illustrating the network element 10 of FIG. 1 as a group of line and data processing cards together with other line cards and the mesh to interconnect them. In one embodiment of the invention, a chassis 23 is coupled to a group of N line cards 25A-N and processing cards 27A, 26B. Additional and other types of devices (not shown) may be coupled to the chassis 23. Packet classification algorithms may be a part of the line cards 25A-N and/or the processing cards 27A-B, alternate embodiments may have alternate card arrangements (a combined line and processing cards with one or more ports and a forwarding engine, one processing card per line card, multiple processing cards per line card, etc.). The data processing cards may build classification trees for use by the line cards or by processing cards. The chassis provides backplane and data plane communication between all of the cards of the network element 10.

In other implementations network elements having other architectural configurations can incorporate embodiments of the invention. Examples of other network elements that could incorporate embodiments of the invention could have multiple forwarding cards or have a single line card incorporating the functionality of both the forwarding and the controlling. Moreover, a network element having the forwarding functionality distributed across the traffic cards could incorporate embodiments of the invention.

The packet classification and classification building cards in the form of line cards 25A-N, and processor cards 27A-B included in the different network elements include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a non-transitory machine-readable storage medium includes read only memory (ROM); random access memory (RAM); magnetic disk storage media; optical storage media; flash memory devices); while a transitory machine-readable communication medium include electrical, optical, acoustical or other form of propagated signals (e.g., carrier waves, infrared signals, digital signals, etc.)

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

Figure 2B:
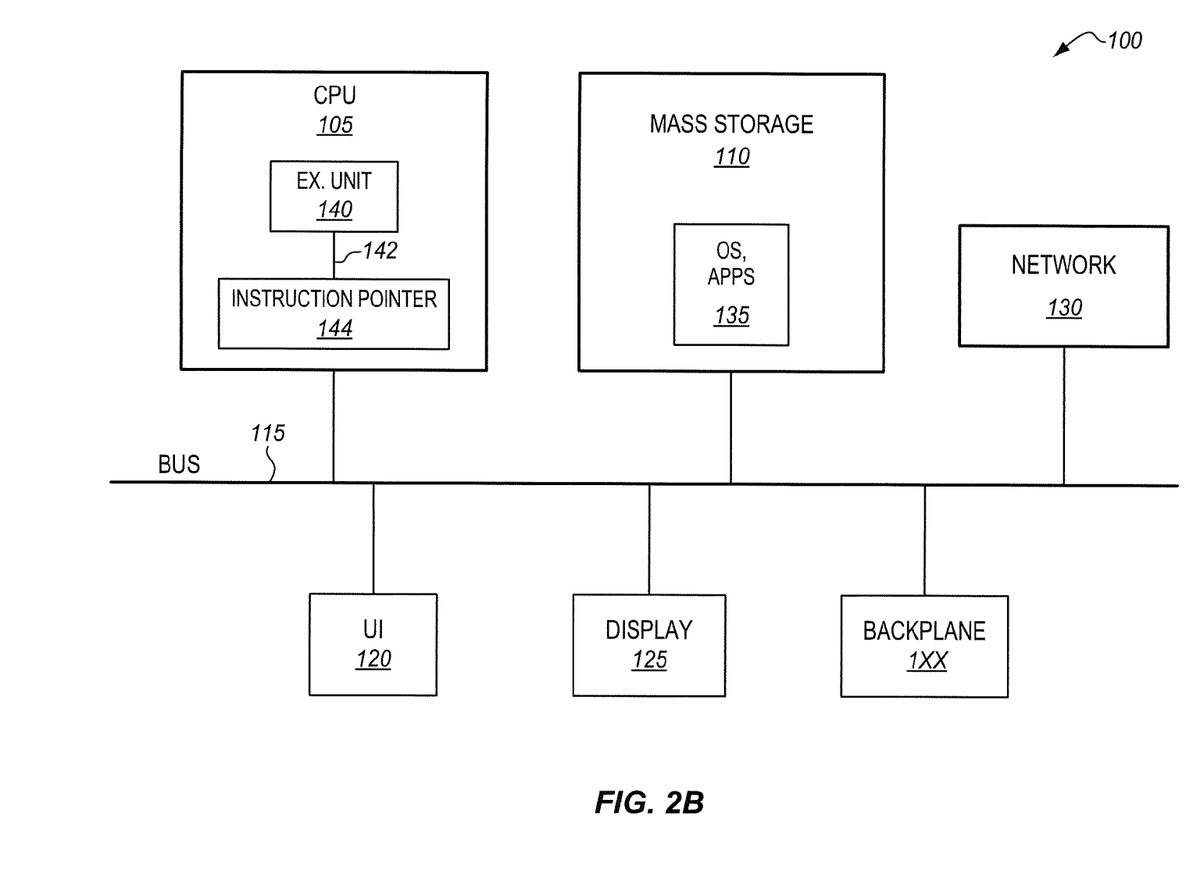
FIG. 2B is a block diagram illustrating an exemplary computer system suitable for use as a network processor according to one embodiment of the invention.

FIG. 2B shows a block diagram illustrating an exemplary computer system 100, suitable for use as a network processor 13 according to one embodiment of the invention. The exemplary computer system 100 includes a processor 105 coupled to a storage device 110 by a bus 115. In addition, a number of user input/output devices, such as a keyboard 120 and a display 125, may also be coupled to the bus 115, but are optional parts. A network 130 interface may also be coupled to bus 115, for example through the chassis 23. The processor 105 (single or multi core; and if multi core, symmetrical or asymmetrical cores) includes at least a central processing unit of any type of architecture, such as CISC, RISC, VLIW, or hybrid architecture. The processor 105 may also include a graphics processing unit (e.g., one or more cores), graphic bus interface(s), a memory management unit, and main memory bus interface(s). Furthermore, the processor 105 may be implemented on one or more die within the same chip. The storage device 110 and network traffic represents one or more machine-readable media. Thus, machine-readable media include any mechanism that provides (i.e., stores and/or transmits) information in a form readable by a machine (e.g., a computer). For example, a machine-readable medium may be machine-readable storage media (e.g., magnetic disks; optical disks; random access memory; read only memory; flash memory devices), machine-readable communication media (e.g., electrical, optical, acoustical or other form of propagated signals—such as carrier waves, infrared signals, digital signals, etc.); etc. The bus 115 represents one or more busses and bridges (also termed as bus controllers). While this embodiment is described in relation to a single processor computer system, other embodiments could include a multi-processor computer system. In addition, while this embodiment is described in relation to a 64-bit computer system, other embodiments of the invention include computer systems using other bit widths.

FIG. 2B also illustrates that the storage device 110 has stored therein packet classification software 135 for execution on the processor 105 to provide for the building of classification trees or the application of classification trees to incoming data packets. Of course, the storage device 110 preferably contains additional software such as an operating system and various applications (not shown).

FIG. 2B additionally illustrates that the processor 105 includes an execution unit 140, an internal bus 142, and an instruction pointer register 144. Of course, processor 110 contains additional circuitry, which is not necessary to understanding this description.

The internal bus 142 couples several of the elements of the processor 105 together as shown. The execution unit 140 is used for executing instructions. The instruction pointer register 144 is used for storing an address of an instruction currently being executed by the execution unit 140.

The term storage is used herein to refer to any mechanism for storing data, including locations in the mass storage device 110, one or more registers in the processor 105, etc. The processor 105 may be capable of executing new instructions and/or instructions similar to or the same as those found in existing general-purpose processors. Furthermore, in one embodiment, the processor 105 is a multi-core processor, with at least some of the cores being simultaneous multi-threaded (e.g., hyperthreaded), superscalar, pipelined, and capable of completing one or more of these instructions per clock cycle (ignoring any data dependencies and pipeline freezes).

The present specification describes a way to use hyper-masks and entropy to build a tree for pattern lookups. A hyper-mask as described herein is a combination of more than one single mask, each applied to a different field of a packet at the same time. This single combination mask is a compound mask in that it is formed from more than one mask.

A tree based pattern matching algorithm may be used with the compound mask. Compound masks may be used at one or more different positions in the algorithm as the classification tree is traversed through corresponding lookup bit fields.

The packet classification tree is made still more efficient in terms of memory usage and lookup time for a given ordered pattern set, using an entropy concept. As described below, entropy is used to find the bit masks with which to build the classification tree. Multiple possible bit masks are compared and the one that maximizes or has a high entropy is selected. Different models can be used to estimate the entropy.

The entropy model allows for an efficient bit mask or set of bit masks for a compound mask, to be determined. The bit masks may then be applied to finding the first or root node bit table entry in the classification tree as well as to later bit table entries. In the end the leaf entry is used to point to an ordered list of rules for final classification. The rules may relate to any of a variety of different applications such as IPv4, IPv6, Ethernet and deep packet inspection.

Figure 3:
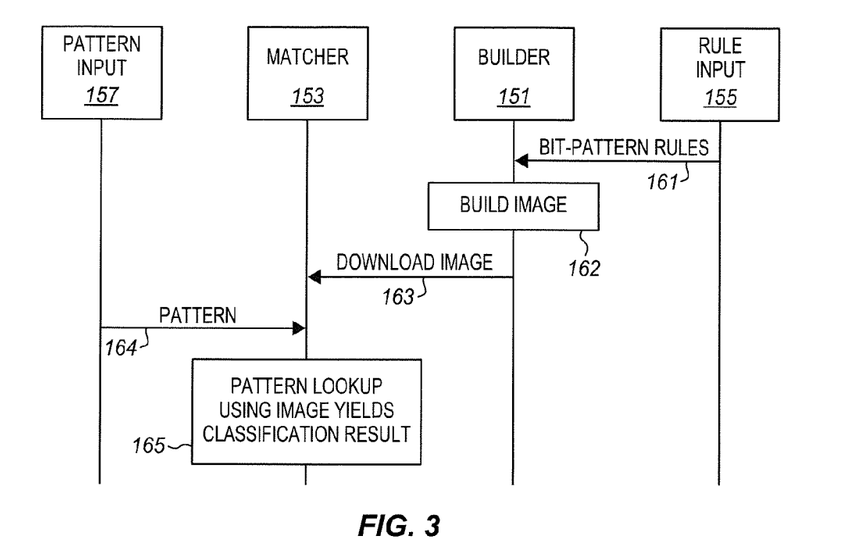
FIG. 3 is a communications flow diagram illustrating the building of a data packet classification tree and its use in a network element according to one embodiment of the invention.

FIG. 3 shows an application of the classification tree described herein using a builder 151 to build the classification tree and a matcher 153 to apply the tree for data packet classification. The builder and the matcher may both be implemented by network processors of network elements or the builder may be an independent device separate and apart from the network nodes. The builder receives as an input 155 the rules that are to be applied to incoming packets. The rules will be framed in terms of particular bit patterns that invoke a particular rule or policy that is then applied to the incoming packet.

Upon receiving the bit pattern rules 161, the builder is able to build an image of the packet classification tree 162. As shown, the builder is provisioned at 161 with the list of patterns. An image is built at 162 and then down loaded 163 to the matcher. The image is stored in memory in the form of bit masks and look up tables for use by the matcher against incoming packets. Accordingly, a source of packets 157 in the network provides incoming packets 164. Selected bit fields are masked by the matcher to use the image to perform the pattern matching 165. After the incoming patterns are matched, a corresponding rule is applied to each packet. As shown, the application of a rule can be referred to as a classification result.

Figure 4:
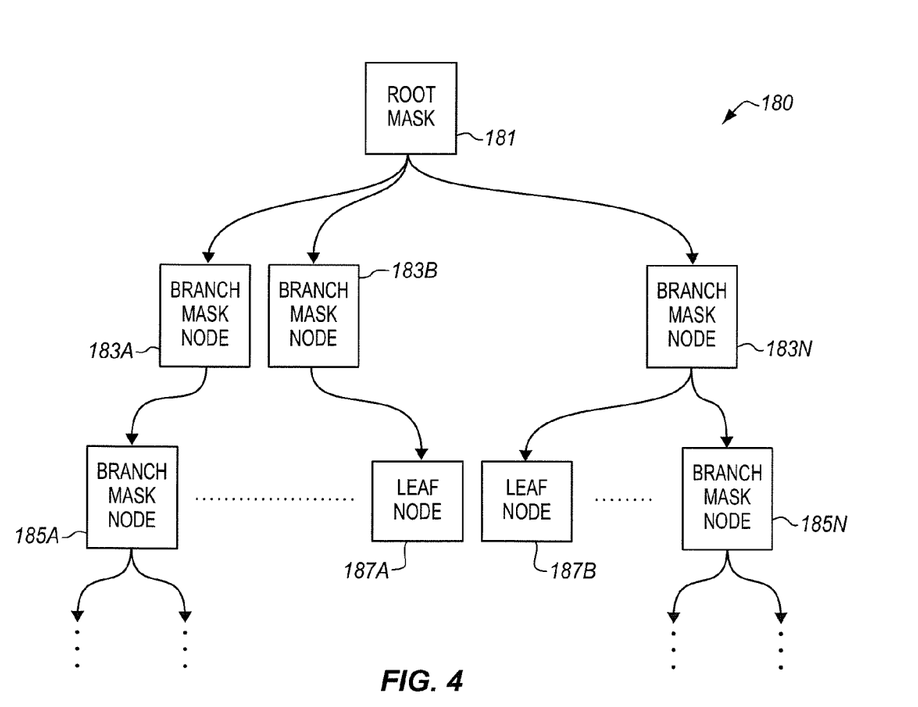
FIG. 4 is a process flow diagram of traversing a packet classification tree according to one embodiment of the invention.

When the classification tree is in place as a downloaded image, the lookup of a given bit pattern is performed by traversing the tree. In FIG. 4, starting at the root 181 of the tree 180, each step consists of choosing one of many branch or child nodes 183A to 183N until a leaf or final node 187A, 187B is reached. The packet classification result at the root node 181 leads to a particular one of the nodes at a second tier of nodes 183A to 183N which, in the illustrated example, are all branch nodes. However, the root node may also point directly to a leaf node for some classification matches. Each branch node points to a third tier of nodes which may be branch nodes 185A to A85N or leaf nodes 187A, 187B.

As shown there may be more branches from the illustrated branch nodes that may lead to more branches and more leaf nodes. Each leaf node has a limited number of rules. The rule for a particular packet is determined by direct pattern matching. The small number of rules at the leaf node can quickly be linearly traversed. By improving the design of the tree, the packet classifier can be improved in efficiency and in speed. The number of rules at each leaf node may be determined in order to balance speed and efficiency with tree complexity. The tree is traversed more quickly when each leaf node has only a single node. However, this greatly increases the complexity of the tree and the size of the look up tables. For each sub-node, the number of rules may be considered. If the number is large, then the sub-node may be assigned to be a branch node that branches to two or more sub-nodes at the next tier.

At each location within the tree, denoted 'current node', the determination of a child node is made by making a number of parallel table lookups using bits of the packet mapped out by bit masks. Depending on the architecture of the hardware parallel or sequential bit mask lookups may be used. The current node contains information about what masks to use and what tables to look-up. The table lookups are combined and another lookup is made to arrive at a choice of the next node, see FIG. 1.

When a leaf node is reached an ordered set of rules needs to be traversed to determine if any and in that case which rule is matched. The set may be empty in which case there is no match. The set may consist of a single rule in which two cases may occur, the single rule is the match (fully classified case) or the bit pattern needs to be checked against the rule to determine if it matches or not (non fully classified case). The leaf node contains information about which case is applicable.

To be able to extract the maximum amount of information with a minimal number of lookups in the classification tree lookup a compound mask may be used at any one or more of the nodes of the classification tree. The compound mask may be a combination of any desired number of non-overlapping masks of any desired length. Such a compound mask may also be referred to as a hyper-mask. The number of masks and the length of the individual masks that make up a compound mask may be adapted to suit any particular application.

Figure 5:
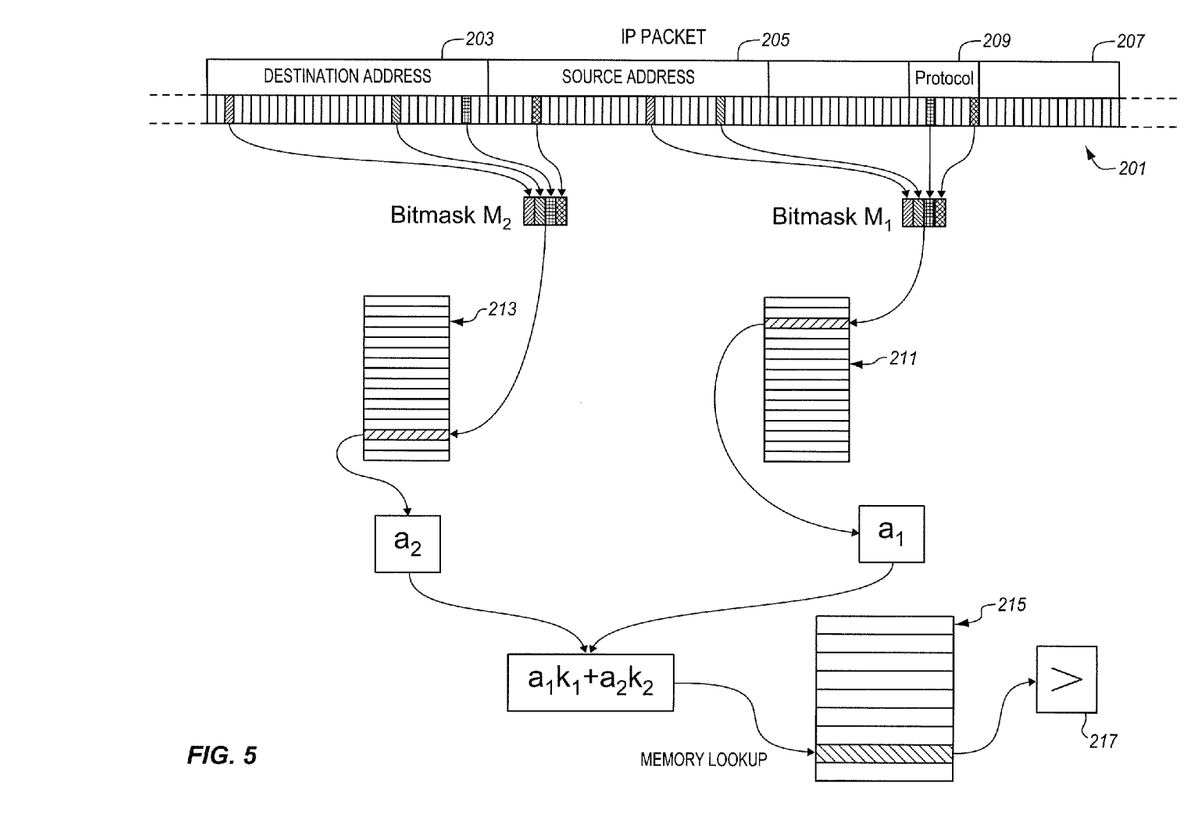
FIG. 5 is a diagram of applying bit masks and look up tables to a data packet according to an embodiment of the invention.

An example of a compound mask is shown in FIG. 5. An incoming IP packet 201 is provided as an example, however, other types of data packets may be classified depending on the nature of the packet data network to which the packet classifier is applied. Among other fields, the IP packet header has a destination address 203, a source address 205, and a payload 207. The packet header also includes a protocol bit sequence 209 that indicates the protocol used by the payload. The specific location, size, and configuration of each field is determined by the particular protocol and packet type and the classification tree and compound mask may be adapted as desired.

In the illustrated example, a first compound bitmask $M_1$, combines a bitmask on the source address with a bit mask on the protocol. Two specifically selected bits are taken for each bitmask and these are combined to form a compound mask that draws on both fields. The masked bits are then applied to a look up table 211. A match at the look up table produces an index $a_1$.

A second compound bitmask $M_2$ takes three bits from a destination address bit mask and one bit from source address bitmask and combines these for application to a second lookup table to produce another index $a_2$. In the illustrated example, two compound masks are used and two table look ups are performed in parallel. This reduces the size of each table and the complexity of the table look ups. For 4 bits, as shown, there are 16 possible binary bit combinations, while for 8 bits there are 256 possible binary bit combinations. As a result, the look up is simpler by using two compound bit masks with 4 bits each as compared to one 8 bit compound mask.

The indexes, $a_1$, $a_2$, are combined to determine a combined index into a third look up table 215. Any of a variety of different combination techniques may be used, depending on the structure of the classification tree and the type of packet data traffic used in the network. In one example, each index is multiplied with a factor and the products are summed to obtain a combined index into the results table 215. The sum serves as an index into the table that then provides a pointer 217 to the next node or to a particular rule.

The operations in the diagram of FIG. 5 may be performed at a root, branch, or leaf node and at any one or more such nodes. The particular bits that are selected by the bit masks are determined by the builder by considering the rules and in some cases by considering the traffic. The rules are considered so that the selected bits are bits that will be different depending on the rule that is to be applied. The traffic is considered so that bits that are almost always the same are examined with less significance than bits that are likely to vary.

As mentioned above, the compound masks may be designed using entropy. When creating a lookup tree, masks or compound masks or hyper-masks may be chosen at each node of the tree based on entropy. The masks that maximize the entropy of the applicable rule set for that node should also be the masks that most significantly reduce possible options for the packet classification. In other words, traversing the lookup tree using the maximum entropy choices will optimize the look up in terms of reaching a result with a small number of steps.

A bit field X may be considered to be matching a given bit pattern (M, P) of the same length if $$X \text{ bit wise and } M = P. \qquad \text{Eq.1}$$

Given an ordered set of bit patterns, the first matching bit pattern for any bit field may be determined using the information theoretic concept of entropy. Entropy allows the resulting classification tree to reduce processing time, classification speed, and memory efficiency.

The possible bit patterns for a particular packet data network may be modeled as a discrete random variable B, made up of multiple possible bit patterns b. The particular probability distribution of B may be selected based on traffic patterns in order to optimize the selection for a particular application. The traffic statistics may be gathered empirically either on-line or off-line or developed theoretically, based for example on understanding the meaning of bits in typical packets and the purpose of the network. As an alternative, the probability distribution may be selected in order to simplify the selection of the compound mask. For example, a flat distribution across the bit fields (each bit is equally likely to be 0 or 1, i.e. 0/1 each have a probability of 0.5) simplifies the calculation of the probabilities.

Given any bit pattern mask M, a probability distribution $p_M(b)$ of the mask M on the bit pattern b is inherited from B. For packet classification, the bits of the packet are to be matched to a rule or policy set. The ordered rule set R is made up of rules 1 to n ($r_1, r_2, \ldots, r_n$) for a total of n rules in the set. For each possible bit-pattern b on the mask M and for each rule $r_i$ (the $i^{th}$ rule) of the rule set R, the probability $p_M(r_i)$ can be determined for the event of matching the rule $r_i$ given that mask M of the bit pattern is known. The entropy H of the bit mask M may be computed using equations 2 and 3 below:

$$H(M) = \sum_{i=1}^{n} p_M(r_i) \log(p_M(r_i)) \qquad \text{Eq. 2}$$

$$p_M(r_i) = \sum_{b} p_M(b) \qquad \text{Eq. 3}$$

where the sum in Eq. 3 is taken over all of the bit patterns b on the mask M, matching the $i^{th}$ rule $r_i$.

If a bit mask restricts out all of the bits that affect a rule, then that bit mask may be excluded before any entropy calculation because it will not help to classify the packet.

In addition if the distribution of the mask M is uniform across all of the bits, then the probability distribution of the mask, $p_M(r_i)$, can be found from the number of bit patterns on M that match the respective rule $r_i$. Computations may also be simplified by avoiding computation for any masks M for which the entropy is zero, H(M)=0. This means that the same rule is matched by all of the bit patterns in m. This is shown in examples below.

When creating a lookup tree according to one embodiment of the invention, the compound masks that are chosen at each node are the compound masks that maximize the entropy of the applicable rule set. In other words, for each node, a rule set is chosen. In some cases, rules may easily be organized in a hierarchy from more general to more specific, however, the best rule set ordering may be the one that leads to the fastest classification, not the ordering that is the most logical. For each rule r, entropies are determined for the various masks M. Then the masks with the highest entropy are combined to generate a compound mask. The effect of this is that traversing the lookup tree will optimize the lookup in terms of reaching a result with a small number of steps As a simple example consider an IP ACL (Internet Protocol Access Control List) consisting of rules matching only the IP address fields. In this case, a mask M that has bits that are only in the other fields, such as protocol or port number, will have H(M)=0. The masks M of the IP address fields will have a positive entropy H(M)>1 so that only masks of the IP address fields will be used.

In some implementations, the length of the masks may be fixed and the total bit field may be divided into a number of masks of fixed length. In this case, finding the masks of maximum entropy is straight forward and will decrease the time needed to build the tree compared to the case where more general compound masks are allowed. An implementation may also choose to fix the number of masks combined into a compound mask, for example based on the available parallel memory channels, for further simplification.

For both the builder and matcher, an architecture based on a general bit pattern algorithm is used in combination with a profile for the specific application. The specific application profile specifies the bit-fields of a data stream which are applicable to pattern matching for that application. For example, the specific application profile may specify the offsets and field lengths necessary to extract the applicable bit fields for IP 5-tuple ACL or DPI lookup.

The same application specific profile may be used by both the builder and the matcher. The builder applies the profile to transform application specific rules to binary patterns. The matcher applies the profile to extract the correct bit fields from a data stream.

The compound masks and the generation of masks using entropy may be used to optimize the efficiency of a binary lookup algorithm in terms of look-up time, processing resources, and memory use. This improves the velocity at which new applications may be developed on top of an existing binary pattern lookup infrastructure, thereby achieving shorter time to market and lower development costs.

The operations of the flow diagrams below will be described with reference to the exemplary embodiments of FIGS. 6 and 7. However, it should be understood that the operations of these flow diagrams can be performed by embodiments of the invention other than those described herein and operations different than those discussed with reference to the flow diagrams.

Figure 6:
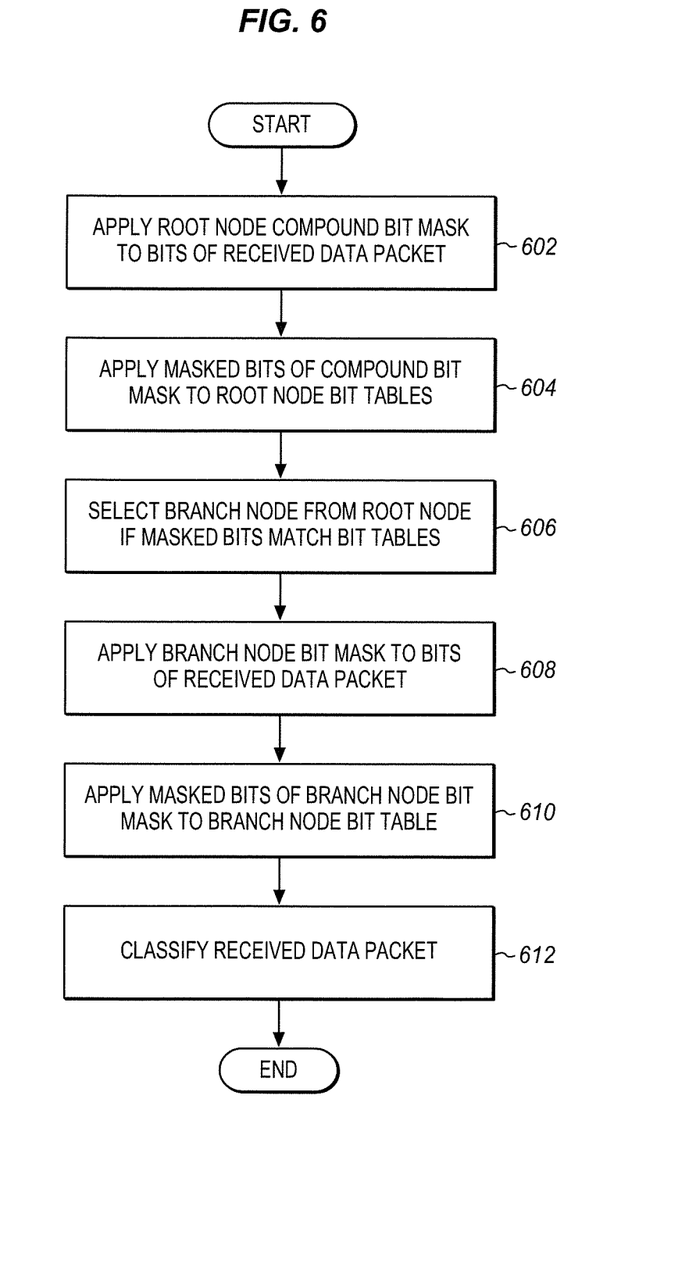
FIG. 6 is a process flow diagram of operating a packet classification tree according to one embodiment of the invention.

Referring to FIG. 6, a method for operating a packet classifier is shown. The operations start by receiving a packet through a network interface that is to be classified. The packet is then processed at a root node and, if necessary, through various branch nodes until it has been classified. At the root node, at 602 a bit mask is applied to the packet to select bits of the packet. If a compound bit mask is used, then the bits are selected from different fields of the data packet. The particular fields are selected based on the classification tree image that has been loaded into the packet classifier. Port fields, address fields, and other fields may be used from headers, tail bits, or from payload.

At 604, the masked bits are applied to the appropriate bit tables. For the root node, bit tables for the root node are used. The classification tree may have multiple separate tables for the different nodes or bit tables for multiple nodes may be combined into one or more tables and distinguished by address ranges, pointers, indexes or in some other way. In the example of FIG. 5, a distinct bit table or bit table range is used for each field of the data packet. The bit tables produce an index for each field as an output. These indices are combined to produce a pointer in a second table. The pointer will point to a branch node, a leaf node, or a rule. The rule provides the end classification result. Sub-tables such as those shown in FIG. 5 may be used in different ways depending on the structure of the packet classification tree. The masked bits may be applied to the sub-tables in parallel or in series depending upon the resources that are available to perform the functions.

Upon applying the bits to the bit tables at 606 a branch node may be selected based on a match from the bit tables. Alternatively, a rule may be selected if the packet classification tree allows for a rule to be selected for the particular packet. For purposes of the present description, the selected branch node may be a leaf node because it points only to rules and not to any further branches.

Upon selecting a branch, a new bit mask is applied at 608 to the data packet, the particular bit mask depending on the particular branch. The branch node bit mask may be a compound mask or a simple mask. At 610 the masked bits are applied to bit tables for the branch node bit table and a result is obtained. The result may be a rule, or a pointer to another branch. Regardless of the result at this stage, eventually at 612, the received data packet is classified.

In the event that the branch node at 610 is a leaf node, then the data packet may be classified by traversing an ordered set of rules using the masked bits in order to determine whether one or more of the rules at that node apply to the packet.

Figure 7:
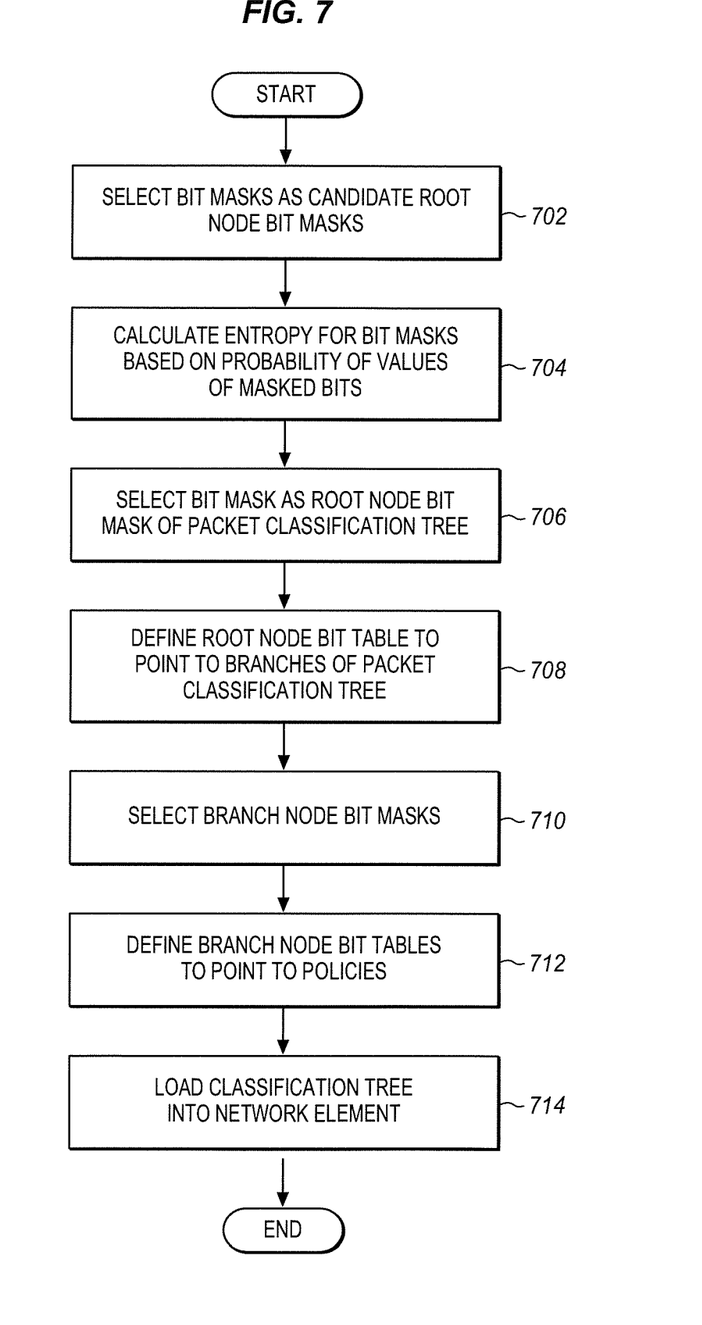
FIG. 7 is a process flow diagram of generating a packet classification tree according to an embodiment of the invention.

FIG. 7 shows an example of generating a packet classification tree for use in FIG. 6 or in any other process for packet classification. The packet classification is generated using a set of bit masks. At 702, bit masks are selected that will serve as candidate bit masks for the root node. The candidate bit masks may be randomly selected. In this case if a field has 16 bits and the bit mask is limited to 2 bits then there are a finite number of different possible masks that are possible.

In order to reduce the number of possible bit masks, the fields and the rules may be analyzed to reduce the possible number of candidates. Some of the bits may not affect the selection of a rule or a policy and these bits may be excluded from the candidate bit masks. The rules may first be ordered so that bit masks are selected that point to parts or all of a particular rule. The selected rules are then implemented in bit tables as mentioned below.

The number of bit masks may also be reduced by considering the traffic. While there may be bits that could affect a rule, in light of actual traffic patterns, the bit may never be used. Such bits may also be excluded from the candidate bit masks.

At 704, the candidate bit masks are applied to an entropy calculation, for example, the entropy calculation described above. The entropy may be based on the probability for the possible values of the relevant bits assuming different values in theoretical or actual traffic. The entropy may be determined by modeling the bit patterns of each of the candidate bit masks as random variables and then assigning a probability distribution to the occurrence of the bit patterns of all of the possible bit masks. The probability distribution may be chosen as a random distribution, a theoretically determined probability or a determined by empirical observations of actual data traffic in a similar or different packet network.

Based on these entropy calculations, at 706 a bit mask is selected as a root node bit mask for the packet classification tree. For compound bit masks, multiple root node bit masks may be combined. The bit masks may each apply to different fields of the data packet or to the same field or to some combination of the same and different fields. In principle, the best bit masks to select are those with the highest entropy. However, in particular implementations, the selected bit mask may have less than the highest entropy due to other considerations, such as rule structure, anticipated traffic or logical data flow in classifying packets through the tree.

Based on the selected root node bit mask, classification tables may be defined at 708 which relate the masked bits to rules or to further branches of the tree or to both. The classification tables are designed to determine how the rules apply. If the rules are defined before the entropy is determined, then the rules used for the entropy calculations can be used in the bit tables.

At 710, branch node bit masks are selected. These may be selected in the same way as the root node bit masks and may be simple or complex. The branch node bit masks may be selected using further entropy calculations or in any other way. In one example, the entropy for each branch node candidate bit masks is determined using only a rule subset that was not determined at the root node and using only bits that were not selected by the root node bit mask. However, the particular candidate bit masks and rules for each branch node may be selected to suit any particular application of the techniques described herein.

At 712, after a branch node bit mask is determined, then the bit tables for that bit masks may be defined. These may be a set of parallel sub-tables or a single table may be used. The bit tables may point to rules, to further branch nodes or both, depending upon the implementation.

Having completed the definition of the packet classification tree with bit masks, bit tables, rules, and the tree structure, the classification tree may be loaded into a network element at 714 for us in classifying packets.

While embodiments of the invention have been described in relation to packet classification for IP ACL, embodiments of the invention are not so limited. Similar techniques and equipment may be used to classify packets in other types of networks. The tree structure may be simple or complex with more or fewer branches and more or fewer levels of nodes. The rules may be rules for routing or rules for handling data packets and the techniques may be applied to many different types of data packets.

For example, while the flow diagrams in the figures show a particular order of operations performed by certain embodiments of the invention, it should be understood that the illustrated order is provided as an example. Alternative embodiments may perform the operations in a different order, combine certain operations, overlap certain operations, etc.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a network element of a packet data network to classify a data packet for application of a packet data network policy comprising:
    applying a root node compound bit mask to bits of a received data packet, the data packet having data in a plurality of fields, the compound bit mask comprising a plurality of bit masks each having bits in a different data packet field;
    applying the masked bits of the compound bit mask to root node bit tables, one for each bit mask of the compound bit mask;
    selecting a branch node from the root node based on a root node bit table look up;
    applying a branch node bit mask associated with the selected branch node to bits of the received data packet;
    applying the masked bits of the selected branch node bit mask to at least one branch node bit table; and
    classifying the received data packet based on a branch node bit table look up.

2. The method of claim 1, wherein the plurality of fields include a port field, address fields, and a header field.

3. The method of claim 1, further comprising selecting a rule to apply to the data packet based on the classifying and wherein the bits of the root node compound bit mask are bits that affect whether the selected rule is applied to the data packet.

4. The method of claim 1, wherein the branch node bit mask is a compound bit mask and wherein applying the masked bits of the selected branch node bit mask comprises applying a compound bit mask to a plurality of branch node bit tables, one for each bit mask of the compound branch node bit mask.

5. The method of claim 1, further comprising traversing a plurality of branch nodes from the root node before classifying the data packet.

6. The method of claim 1, wherein applying the masked bits to root node bit tables comprises performing sub-table look ups by applying different ones of the masked bits to different root node bit sub-tables in parallel, combining the parallel look ups for a combined result, and wherein selecting a branch node comprises applying the combined result to a branch selection look up table.

7. The method of claim 1, wherein if the selected branch node is a leaf node, then applying the masked bits of the selected branch node comprises traversing an ordered set of rules to determine whether one or more of the rules matches the data packet.

8. A network element for use in a packet data network to classify a data packet for application of a packet data network policy, the network element comprising:
    an ingress module to receive a data packet, from the packet data network, the data packet having a plurality of fields;
    an egress module to forward the data packet to another network element based on a policy; and
    a network processor having a classification tree with a plurality of bit tables, the network processor operative to:
    apply a root node compound bit mask to bits of a received data packet, the compound bit mask comprising a plurality of bit masks each having bits in a different data packet field;
    apply the masked bits of the compound bit mask to root node bit tables, one for each bit mask of the compound bit mask;

select a branch node from the root node based on a root node bit table look up;
apply a branch node bit mask associated with the selected branch node to bits of the received data packet;
apply the masked bits of the selected branch node bit mask to at least one branch node bit table; and
classify the received data packet based on a branch node bit table look up.

9. The network element of claim 8, wherein the classification tree further comprises a plurality of branch nodes from the root node to leaf nodes and wherein the network processor traverses a plurality of branch nodes before classifying the data packet.

10. The network element of claim 8, wherein the network processor comprise a branch selection look up table for each branch of the classification tree and wherein the network processor performs sub-table look ups by applying different ones of the masked bits to different root node bit sub-tables in parallel, combines the parallel look ups for a combined result, and selects a branch node by applying the combined result to a branch selection look up table for the respective current node.

11. A method for generating a sequence of bit masks for a packet classification tree for use by a network element of a packet data network to classify data packets for application of a packet data network policy, the method comprising:
selecting a plurality of bit masks as candidate root node bit masks;
calculating an entropy for each of the bit masks based on a probability of different values of the masked bits;
selecting a bit mask from the candidate root node bit masks as a root node bit mask of the packet classification tree;
defining a root node bit table for the selected bit mask to point to branches of the packet classification tree;
selecting branch node bit masks;
defining branch node bit tables to point to policies to classify a data packet.

12. The method of claim 11, wherein the data packets of the packet data network have a plurality of fields and the bit masks apply to different fields of the data packets.

13. The method of claim 11, wherein calculating an entropy comprises:
modeling bit patterns of possible bit masks as discrete random variables;
assigning a probability distribution to the occurrence of the bit patterns of the possible bit masks; and
computing an entropy for each bit pattern of the possible bit masks.

14. The method of claim 13, wherein assigning a probability distribution comprises applying traffic statistics of data packets of the packet data network to determine probabilities of the occurrence of bit patterns.

15. The method of claim 13, further comprising assigning a rule set for the root node and wherein calculating an entropy comprises calculating an entropy for the assigned rule set.

16. The method of claim 11, wherein selecting a bit mask comprises selecting a bit mask with high entropy.

17. The method of claim 11, wherein selecting a plurality of bit masks further comprises determining bits that do not affect the selection of a policy and excluding the determined bits from the selected plurality of bit masks.

18. The method of claim 11, wherein selecting a plurality of bit masks comprises selecting bit masks for bits of different fields of a data packet and wherein selecting a bit mask as a root node bit mask comprises selecting a bit masks for different fields and combining the bit masks to form a compound bit mask as the root node bit mask.

19. The method of claim 11, further comprising:
selecting a second plurality of bit masks;
calculating an entropy for each of the bit masks of the second plurality of bit masks based on a probability of different values of the masked bits; and
selecting a subset of bit masks of the second plurality of bit masks as branch nodes of the packet classification tree.

20. A non-transitory computer-readable medium having instructions stored thereon that, when executed by a machine, cause the machine to perform operations for generating a sequence of bit masks for a packet classification tree for use by a network element of a packet data network to classify data packets for application of a packet data network policy, the operations comprising: selecting a plurality of bit masks as candidate root node bit masks; calculating an entropy for each of the bit masks based on a probability of different values of the masked bits; selecting a bit mask from the candidate root node bit masks as a root node bit mask of the packet classification tree; defining a root node bit table for the selected bit mask to point to branches of the packet classification tree; selecting branch node bit masks; defining branch node bit tables to point to policies to classify a data packet; wherein the data packets of the packet data network have a plurality of fields and the bit masks apply to different fields of the data packets.

21. The non-transitory medium of claim 20, wherein calculating an entropy comprises: modeling bit patterns of possible bit masks as discrete random variables;
assigning a probability distribution to the occurrence of the bit patterns of the possible bit masks; and computing an entropy for each bit pattern of the possible bit masks.

22. The non-transitory medium of claim 20, wherein the operations further comprise loading the classification tree into a network element of a packet data network.

* * * * *

UNITED STATES PATENT AND TRADEMARK OFFICE
CERTIFICATE OF CORRECTION

PATENT NO. : 8,750,309 B2
APPLICATION NO. : 13/408771
DATED : June 10, 2014
INVENTOR(S) : Ernström It is certified that error appears in the above-identified patent and that said Letters Patent is hereby corrected as shown below:

In the Specification

In Column 4, Line 49, delete "(VOW)" and insert -- (VOIP) --, therefor.

In Column 7, Line 38, delete "processor 110" and insert -- processor 105 --, therefor.

In Column 8, Line 51, delete "nodes185A to A85N" and insert -- nodes 185A to 185N --, therefor.

Signed and Sealed this
Sixteenth Day of September, 2014

Michelle K. Lee
*Deputy Director of the United States Patent and Trademark Office*